US012280515B2

(12) United States Patent
Jacko

(10) Patent No.: US 12,280,515 B2
(45) Date of Patent: Apr. 22, 2025

(54) KNIFE ASSEMBLY WITH TAB BLADES AND METHOD OF FABRICATION

(71) Applicant: Urschel Laboratories, Inc., Chesterton, IN (US)

(72) Inventor: Michael Scot Jacko, Valparaiso, IN (US)

(73) Assignee: Urschel Laboratories, Inc., Chesterton, IN (US)

( * ) Notice: Subject to any disclaimer, the term of this patent is extended or adjusted under 35 U.S.C. 154(b) by 0 days.

(21) Appl. No.: 18/593,632

(22) Filed: Mar. 1, 2024

(65) Prior Publication Data

US 2024/0316812 A1 Sep. 26, 2024

Related U.S. Application Data

(62) Division of application No. 17/701,379, filed on Mar. 22, 2022.

(60) Provisional application No. 63/164,129, filed on Mar. 22, 2021.

(51) Int. Cl.

| | |
|---|---|
| ***B26D 1/00*** | (2006.01) |
| ***B26D 1/03*** | (2006.01) |
| ***B26D 3/26*** | (2006.01) |
| ***B26D 3/28*** | (2006.01) |
| ***B26D 7/06*** | (2006.01) |

(52) U.S. Cl.

CPC ............. *B26D 1/0006* (2013.01); *B26D 1/03* (2013.01); *B26D 3/26* (2013.01); *B26D 3/283* (2013.01); *B26D 7/0691* (2013.01); *B26D 2001/0033* (2013.01); *B26D 2001/006* (2013.01); *B26D 2003/288* (2013.01)

(58) Field of Classification Search

CPC .......... B26D 1/0006; B26D 1/03; B26D 3/26; B26D 3/283; B26D 7/0691; B26D 2001/0033; B26D 2001/006; B26D 2003/288

See application file for complete search history.

(56) References Cited

U.S. PATENT DOCUMENTS 1,486,317 A * 3/1924 Barry .................. B21D 53/645 76/104.1
RE16,115 E * 7/1925 Schlafly ................. B21D 13/02 72/379.6
2,590,024 A * 3/1952 Lieberman .............. B26B 13/10 30/230

(Continued)

*Primary Examiner* — Jonathan G Riley
(74) *Attorney, Agent, or Firm* — Hartman Global IP Law; Gary M. Hartman; Domenica N. S. Hartman

(57) ABSTRACT

Knife assemblies having primary and secondary blades and at least one tab blade. The primary and secondary blades each have a corrugated shape as a result of defining a wave pattern that defines peaks and valleys. The primary and secondary blades each further having upper and lower surfaces, leading and trailing edges, and a depth defined by and between the leading and trailing edges. The upper surface of the primary blade and the lower surface of the secondary blade are complementary so that the secondary blade and the peaks and valleys thereof are able to nest on the primary blade and the peaks and valleys thereof. The secondary blade has at least one tab blade that projects from one of its peaks and is defined by a cut in the peak to form a tab that is bent so that the tab projects from the peak.

9 Claims, 4 Drawing Sheets

(56) References Cited

U.S. PATENT DOCUMENTS

| | | | | | |
|---|---|---|---|---|---|
| 3,395,742 | A * | 8/1968 | Sanders | B26D 1/0006 83/698.41 |
| 4,050,841 | A * | 9/1977 | Hildebrandt | B27G 15/00 408/214 |
| 4,590,835 | A * | 5/1986 | Matsuo | B26D 7/2614 83/858 |
| D742,701 | S * | 11/2015 | Bucks | D7/381 |
| 2010/0236372 | A1* | 9/2010 | Desailly | B26D 1/553 83/858 |
| 2013/0276604 | A1* | 10/2013 | King | B26D 1/03 83/52 |
| 2014/0260850 | A1* | 9/2014 | Reis | B26D 7/0691 83/837 |
| 2015/0107426 | A1* | 4/2015 | King | B26D 3/26 83/52 |
| 2016/0288358 | A1* | 10/2016 | Bucks | B26D 1/36 |

* cited by examiner

KNIFE ASSEMBLY WITH TAB BLADES AND METHOD OF FABRICATION

CROSS-REFERENCE TO RELATED APPLICATIONS

This is a division patent application of co-pending U.S. patent application Ser. No. 17/701,379 filed Mar. 22, 2022, which claims the benefit of U.S. Provisional Application No. 63/164,129 filed Mar. 22, 2021. The contents of these prior patent documents are incorporated herein by reference.

BACKGROUND OF THE INVENTION

The present invention generally relates to methods and equipment for cutting food products, and shapes of food products produced thereby.

Various types of equipment are known for slicing, shredding and granulating food products, as nonlimiting examples, vegetables, fruits, dairy products, and meat products. Widely used machines for this purpose are commercially available from Urschel Laboratories, Inc., and include machines under the name Model CC®. The Model CC® machines are centrifugal-type slicers capable of slicing a wide variety of products at high production capacities. The Model CC® line of machines is particularly adapted to produce uniform slices, strip cuts, shreds, and granulations. Certain configurations and aspects of Model CC® machines are represented in U.S. Pat. Nos. 3,139,128, 3,139,129, 5,694,824, 6,968,765, 7,658,133, 8,161,856, 9,193,086, 10,456,943, and 10,632,639, the entire contents of which are incorporated herein by reference.

FIG. 1 schematically represents a cross-sectional view of a machine 10 that is representative of a Model CC® machine. The machine 10 includes a generally annular-shaped cutting head 12 and an impeller 14 coaxially mounted within the cutting head 12. The impeller 14 has an axis 17 of rotation that coincides with the center axis of the cutting head 12, and is rotationally driven about its axis 17 through a shaft (not shown) that is enclosed within a housing 18 and coupled to a gear box 16. The cutting head 12 is mounted on a support ring 15 above the gear box 16 and remains stationary as the impeller 14 rotates. Products are delivered to the cutting head 12 and impeller 14 through a feed hopper 11 located above the impeller 14. In operation, as the hopper 11 delivers products to the impeller 14, centrifugal forces cause the products to move outward into engagement with cutting knives (not shown) that are mounted along the circumference of the cutting head 12. The impeller 14 comprises generally radially oriented paddles 13, each having a face that engages and directs the products radially outward toward and against the knives of the cutting head 12 as the impeller 14 rotates. Other aspects pertaining to the construction and operation of Model CC® machines, including various embodiments thereof, can be appreciated from the aforementioned prior patent documents incorporated herein by reference.

FIG. 2 is an isolated view of a particular but nonlimiting example of a cutting head 12 that has been used with Model CC® slicing machines, including the machine 10 schematically represented in FIG. 1. The cutting head 12 represented in FIG. 2 will be described hereinafter in reference to the machine 10 of FIG. 1 equipped with an impeller 14 as described in reference to FIG. 1. On the basis of the coaxial arrangement of the cutting head 12 and the impeller 14, relative terms including but not limited to "axial," "circumferential," "radial," etc., and related forms thereof may be used below to describe the cutting head 12 represented in FIG. 2.

In FIG. 2, the cutting head 12 can be seen as generally annular-shaped with cutting knives 20 mounted and circumferentially spaced apart along its perimeter. FIG. 2 represents the knives 20 as having straight cutting edges for producing flat slices, and as such may be referred to herein as "flat" knives, though the cutting head 12 can use knives of other shapes, for example, "corrugated" knives characterized by a periodic pattern, including but not limited to a sinusoidal shape with peaks and valleys when viewed edgewise, to produce corrugated, strip-cut, shredded and granulated products. Each knife 20 projects radially inward in a direction generally opposite the direction of rotation of the impeller 14 within the cutting head 12, and defines a cutting edge at its innermost radial extremity. The cutting head 12 further comprises lower and upper support members, represented in FIG. 2 as rings 22 and ring 24, to and between which circumferentially-spaced support segments, referred to herein as shoes 26, are secured with fasteners 34.

As also represented in FIG. 2, a knife 20 can be associated with each shoe 26, in which case the shoes 26 may be referred to as cutting stations of the cutting head 12. The knives 20 of the cutting head 12 are represented in FIG. 2 as being individually secured with clamping assemblies 28 to their respective shoes 26. Each clamping assembly 28 includes a knife holder 30 mounted between the support rings 22 and 24, and a clamp 32 positioned on the radially outward-facing side of the holder 30 to secure a knife 20 thereto. Each knife 20 is supported by a radially outer surface of one of the knife holders 30, and the corresponding clamp 32 overlies the holder 30 so that the knife 20 is between the outer surface of the holder 30 and a radially inward surface of the clamp 32 that faces the holder 30. By forcing the clamp 32 toward the holder 30, the clamp 32 applies a clamping force to the knife 20 adjacent its cutting edge. FIG. 2 further shows a gate 36 secured to each shoe 26. A food product crosses the gate 36 prior to encountering the knife 20 mounted to the succeeding shoe 26, and together the cutting edge of a knife 20 and a trailing edge of the preceding gate 36 define a gate opening that determines the thickness of a slice produced by the knife 20.

In addition to flat knives and corrugated knives noted above, various other types of knives have been developed for making specific types of cuts in food products, examples of which are knives developed to produce what is known as a julienne cut. Such a cut generally results in a product, in some cases a vegetable, being cut into long strips. Nonlimiting examples of julienne-type knives are disclosed in U.S. Pat. Nos. 9,469,041, 9,840,015, 9,849,600, and 10,843,363, each of which may be used in various machines including the aforementioned Urschel Model CC® machines. These knives may be characterized as corrugated in that their profiles, when viewed from the leading edges of the knives, resemble a wave pattern, but with the further inclusion of julienne "tab" blades located at the peaks of the waves of the knife (sometimes referred to herein as a "primary blade") to produce a desired julienne cross-section. The tab blades of a julienne-type knife may be metallurgically joined to the primary blade or provided by a second member (sometimes referred to as a julienne or secondary blade) that is assembled with the primary blade to yield what may be termed a knife assembly. In use, the leading edge of the primary blade cuts a slice off of a product, followed by the julienne tab blades that cut the slice into strips. Julienne-type knives can be used to produce a variety of product shapes, including shaped shredded and shaped strip-cut food products, nonlimiting examples of which include those disclosed in U.S. Pat. Nos. 9,469,041, 9,840,015, and 9,849,600 and U.S. Design Pat. Nos. D711068, D704919, D701670, D701671, D701,672, D701,366, and D760,992.

While existing julienne-type knives are well suited for their intended purpose, it would be desirable if alternative configurations of knives were available for producing julienne cuts in products.

BRIEF SUMMARY OF THE INVENTION

The present invention provides knife assemblies of types suitable for producing julienne cuts in products. The knife assemblies include a primary blade and a secondary blade that is equipped with at least one tab blade and can be assembled with the primary blade without the need to fuse the primary and secondary blades together.

According to an aspect of the invention, a knife assembly includes a primary blade having a corrugated shape as a result of the primary blade defining a wave pattern that defines peaks and valleys. The primary blade has an upper surface, a lower surface, a cutting edge, a trailing edge, and a depth defined by and between the cutting and trailing edges. The knife assembly further includes a secondary blade having a corrugated shape as a result of the secondary blade defining a wave pattern that defines peaks and valleys. The secondary blade has an upper surface, a lower surface, a leading edge, a trailing edge, and a depth defined by and between the leading and trailing edges. The upper surface of the primary blade and the lower surface of the secondary blade are complementary so that the secondary blade and the peaks and valleys thereof are able to nest on the primary blade and the peaks and valleys thereof. The secondary blade has at least a first tab blade projecting from a first peak of the peaks of the secondary blade. The tab blade is defined by a cut in the first peak to form a tab that is bent so that the tab projects from the first peak of the secondary blade and an opening is defined in the first peak.

According to another aspect of the invention, a method of fabricating a knife assembly utilizes a primary blade having a corrugated shape as a result of the primary blade defining a wave pattern that defines peaks and valleys. The primary blade has an upper surface, a lower surface, a cutting edge, a trailing edge, and a depth defined by and between the cutting and trailing edges. The method further utilizes a blank having a corrugated shape defining a wave pattern that defines peaks and valleys. The blank has an upper surface, a lower surface, a leading edge, a trailing edge, and a depth defined by and between the leading and trailing edges. The upper surface of the primary blade and the lower surface of the blank are complementary so that the blank and the peaks and valleys thereof are able to nest on the primary blade and the peaks and valleys thereof. A secondary blade is then fabricated from the blank so that the secondary blade has at least the corrugated shape, the wave pattern, the peaks and valleys, the upper surface, the lower surface, and at least a portion of the leading edge of the blank, and so that the lower surface of the secondary blade is complementary with the upper surface of the primary blade, enabling the secondary blade and the peaks and valleys thereof to nest on the primary blade and the peaks and valleys thereof. The secondary blade is fabricated from the blank to have at least a first tab blade projecting from a first peak of the peaks of the secondary blade. The tab blade is defined by cutting the first peak to form a tab and then bending the tab so that the tab projects from the first peak and an opening is defined in the first peak. The secondary blade can then be assembled on the primary blade so that the secondary blade and the peaks and valleys thereof nest with the primary blade and the peaks and valleys thereof.

A technical effect of the invention is the ability to produce products, including shredded and strip-cut food products, having a variety of shapes by performing julienne cuts with a knife assembly that does not require tab blades metallurgically bonded to a primary blade. Instead, the julienne cuts can be achieved with a knife assembly comprising a primary blade and a secondary blade equipped with tab blades, in which the secondary blade can be fabricated by modifying a blank that may be identical to the primary blade, thereby reducing the manufacturing costs of the secondary blade and/or the knife assembly as a whole.

Other aspects and advantages of this invention will be appreciated from the following detailed description.

DETAILED DESCRIPTION OF THE INVENTION

Figure 1:
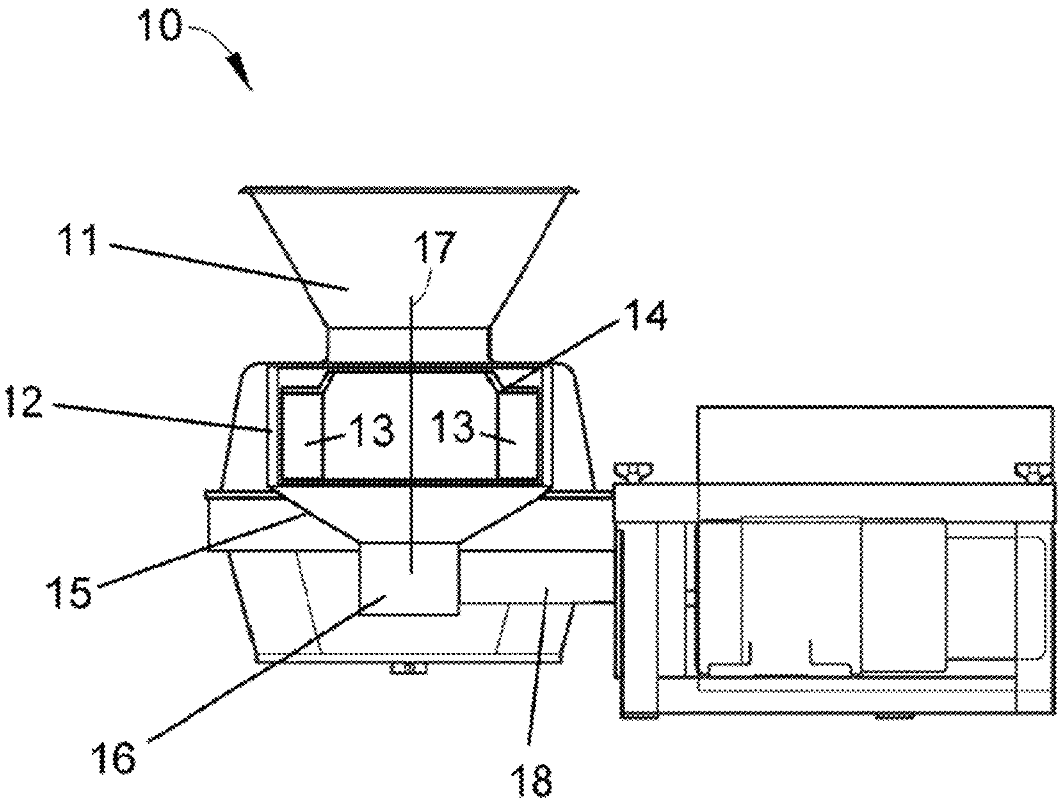
FIG. 1 Prior Art
FIG. 1 schematically represents a side view in partial cross-section of a centrifugal-type slicing machine known in the art.

The intended purpose of the following detailed description of the invention and the phraseology and terminology employed therein is to describe what is shown in the drawings, which include the depiction of one or more nonlimiting embodiments of the invention, and to describe certain but not all aspects of what is depicted in the drawings, including the embodiment(s) depicted in the drawings.

The following detailed description also identifies certain but not all alternatives of the embodiment(s) depicted in the drawings. As nonlimiting examples, the invention encompasses additional or alternative embodiments in which one or more features or aspects shown and/or described as part of a particular depicted embodiment could be eliminated, and also encompasses additional or alternative embodiments that combine two or more features or aspects shown and/or described as part of different depicted embodiments. Therefore, the appended claims, and not the detailed description, are intended to particularly point out subject matter regarded to be aspects of the invention, including certain but not necessarily all of the aspects and alternatives described in the detailed description.

Figure 2:
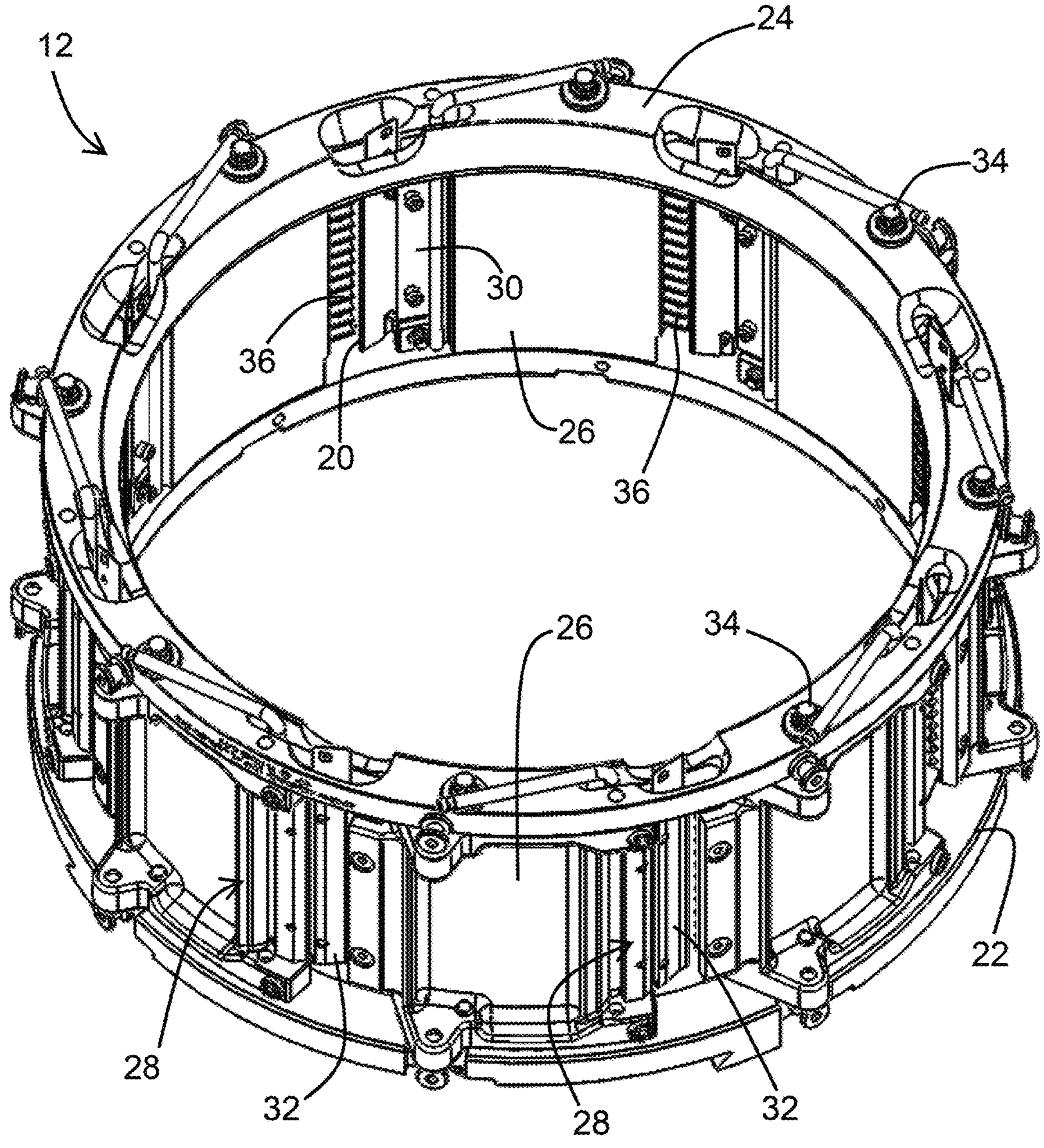
FIG. 2 Prior Art
FIG. 2 is a perspective view representing details of a cutting head that has found use in slicing machines of the type represented in FIG. 1.
Figure 3:
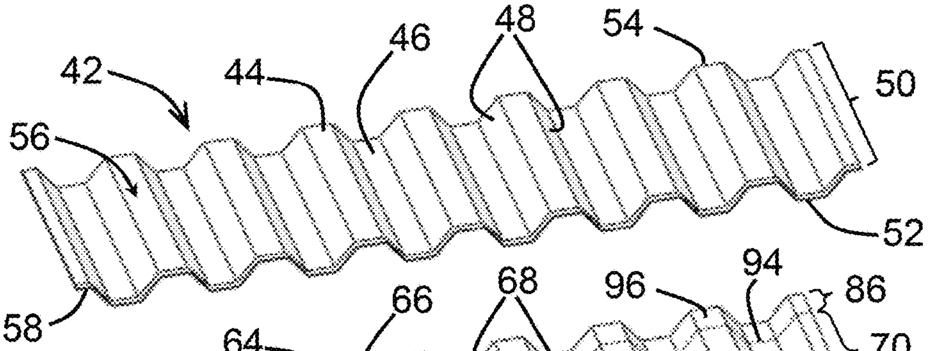
FIG. 3 is a perspective view of a primary blade of a type suitable for use in knife assemblies according to nonlimiting embodiments of the present invention.

FIGS. 3 through 8 schematically represent nonlimiting embodiments of a knife assembly 40 and components thereof that are capable of use with a variety of cutting machines, including the centrifugal-type slicing machine 10 depicted in FIG. 1 and the cutting head of FIG. 2. In some instances, knife assemblies of the type disclosed herein may serve as replacements or modifications of knife assemblies and components for machines and cutting heads of the type represented in FIGS. 1 and 2. As a matter of convenience, the knife assembly 40 and its components will be illustrated and described hereinafter in reference to the slicing machine 10 of FIG. 1 equipped with an annular-shaped cutting head 12 as described in reference to FIGS. 1 and 2. As such, the following discussion will focus primarily on certain aspects of the illustrated knife assembly 40 and that will be described in reference to certain aspects of the machine 10 and cutting head 12 represented in FIGS. 1 and 2, whereas other aspects of the knife assembly 40, machine 10, and cutting head 12 not discussed in any detail below may be essentially as was described in reference to FIGS. 1 and 2. However, it will be appreciated that the teachings of the invention may also be generally applicable to other types of cutting machines. Moreover, though such machines and cutting heads are particularly well suited for slicing food products, it is within the scope of the invention that knife assemblies described herein could be utilized in machines and cutting heads adapted to cut a wide variety of other types of materials.

To facilitate the description provided below of the knife assembly 40 represented in the drawings, relative terms may be used in reference to the orientation of the knife assembly 40 within the cutting head 12 of FIG. 2, as represented by the cutting head 12 and impeller 14 of the machine 10 represented in FIG. 1. On the basis of the coaxial arrangement of the cutting head 12 and impeller 14 in FIG. 1, relative terms including but not limited to "axial," "circumferential," "radial," etc., and related forms thereof may also be used below to describe the nonlimiting embodiments represented in the drawings. All such relative terms are useful to describe the knife assembly 40 depicted in FIGS. 3 through 8 but should not be otherwise interpreted as limiting the scope of the invention. Furthermore, as used herein, "leading" (and related forms thereof) refers to a position on the cutting head 12 that is ahead of or precedes another in the direction of rotation of the impeller 14 when assembled with and rotating within a cutting head 12, whereas "trailing" (and related forms thereof) refers to a position on the cutting head 12 that follows or succeeds another relative to the direction of rotation of the impeller 14.

Figure 6:
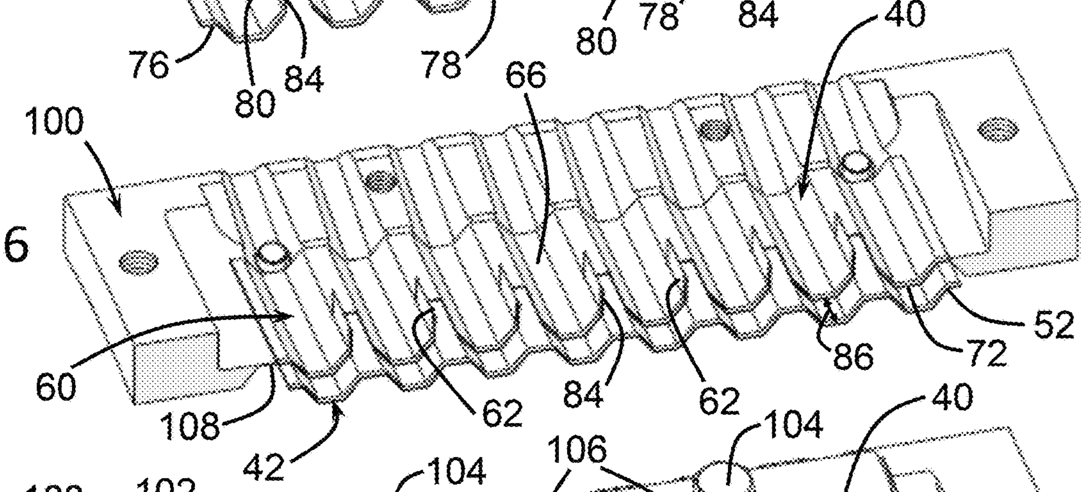
FIG. 6 is a perspective view of the primary blade of FIG. 3 and the secondary blade of FIG. 5 assembled together to yield a knife assembly, which in turn has been positioned on a knife holder according to a nonlimiting embodiment of the present invention.
Figure 7:
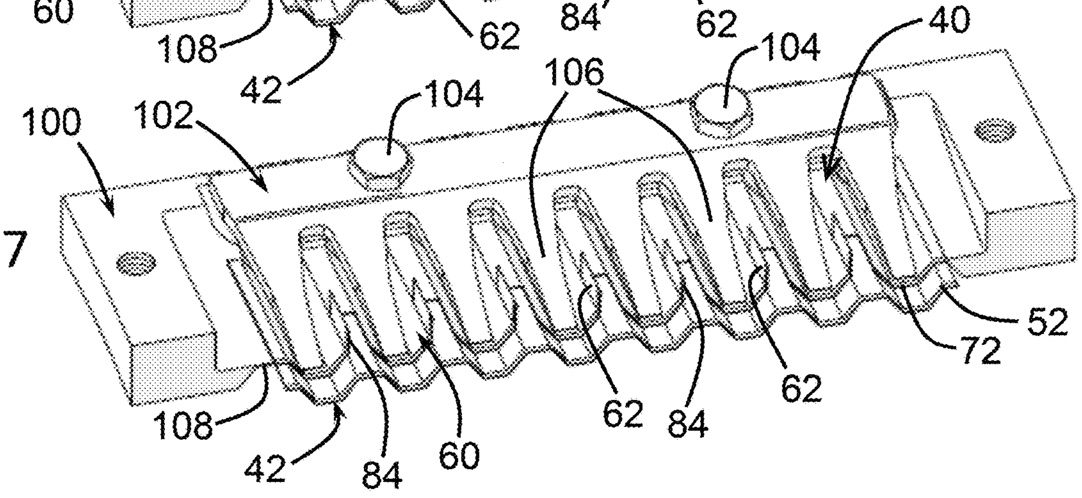
FIG. 7 is a perspective view of the knife assembly and knife holder of FIG. 6, and a clamp shown as securing the knife assembly to the knife holder according to a nonlimiting embodiment of the present invention.

FIGS. 6 and 7 represent the knife assembly 40 as being of a type suitable for producing julienne cuts in food products. The assembly 40 is particularly well suited for producing uniform cuts in bulk quantities of food products. The assembly 40 includes a primary blade 42 (shown in isolation in FIG. 3) having a profile that, when viewed from either a cutting (leading) edge 52 or trailing edge 54 of the blade 42, has a corrugated shape as a result of the blade 42 defining a periodic wave pattern adapted to produce a relatively large-amplitude shaped food product. The wave pattern defines periodic peaks 44 and valleys 46 that are represented as generally flat and parallel to each other, as opposed to peaks and valleys characterized by an angular shape (V-shaped) or peaks and valleys that are defined by appreciable radii, though these and various other shapes are also within the scope of the invention. The peaks 44 and valleys 46 are interconnected by walls 48, which are represented as not perpendicular to the peaks 44 and valleys 46 but instead inclined relative thereto so that each wall 48 defines an obtuse angle with each of its adjoining peak 44 and valley 46. The primary blade 42 is further characterized by having a depth 50 between its cutting and trailing edges 52 and 54.

The assembly 40 represented in FIGS. 6 and 7 further includes a secondary (julienne) blade 60 (shown in isolation in FIG. 5) with multiple tab blades 62 located at or adjacent peaks 64 of the secondary blade 60. As should be apparent from FIGS. 6 and 7, the tab blades 62 enable the knife assembly 40 to produce shaped shredded and shaped strip-cut products from an intermediate slice product. The knife assembly 40 is shown in FIG. 6 as installed on a knife holder 100, and shown in FIG. 7 as clamped to the knife holder 100 with a clamp 102 and (in the depicted embodiment) bolts 104 to keep the knife assembly 40 (and therefore its primary and secondary blades 42 and 60) securely in place on the knife holder 100. To ensure the stability and rigidity of the primary blade 62 on the knife holder 100, the support surface of the knife holder 100 that receives the primary blade 42 is preferably complementary shaped so that the primary blade 42 will nest on the support surface of the knife holder 100 with minimal or no gaps therebetween as a result of the lower surface 58 of the primary blade 42 making continuous surface-to-surface contact with the support surface of the knife holder 100.

Figure 4:
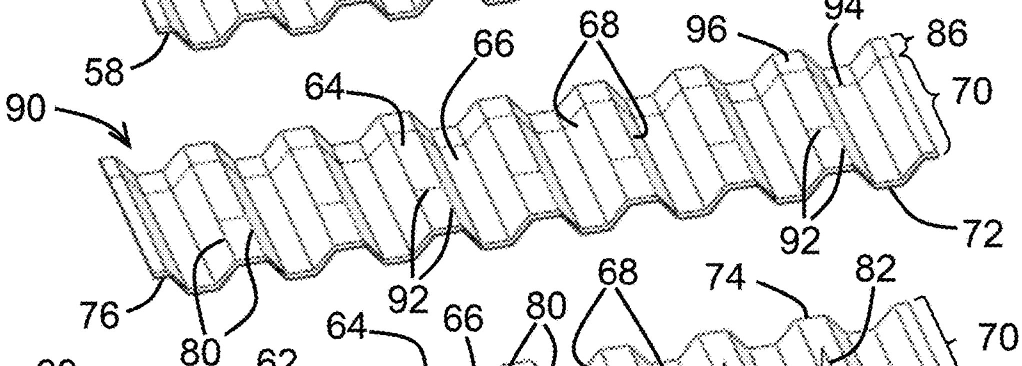
FIG. 4 is a perspective view of a blank that can be modified to produce a secondary blade that can be assembled with the primary blade of FIG. 3 to yield a knife assembly according to nonlimiting embodiments of the present invention.

Referring again to FIG. 5, the secondary blade 60 is shaped similarly to the primary blade 42. In particular, the secondary blade 60 has a profile that, when viewed from either a leading edge 72 or trailing edge 74 of the blade 60, resembles a wave pattern that is geometrically similar or, in the nonlimiting embodiment shown, geometrically congruent to the wave pattern of the primary blade 42 so that an upper surface 56 of the primary blade 42 is complementary shaped to a lower surface 76 of the secondary blade 60, enabling the secondary blade 60 to nest on the upper surface 56 of the primary blade 42 with minimal or no gaps therebetween as a result of the lower surface 76 of the secondary blade 60 making continuous surface-to-surface contact with the upper surface 56 of the primary blade 42. In view of the geometrically similar shapes of the primary and secondary blades 42 and 60, the wave pattern of the secondary blade 60 also defines peaks 64 and valleys 66 that are generally flat and interconnected by walls 68 that are inclined relative to the peaks 64 and valleys 66 so that each wall 68 defines an obtuse angle with each of its adjoining peak 64 and valley 66. In FIG. 4, the intersections of the peaks 64 and walls 68 define corners 80 therebetween, and the intersections of the valleys 66 and walls 68 define corners (not labeled) therebetween. The secondary blade 60 is further characterized by having a depth 70 between its leading and trailing edges 72 and 74.

Because the secondary blade 60 nests on the upper surface 56 of the primary blade 42, the primary blade 42 is not required to have slots through which the tab blades 62 of the secondary blade 60 protrude through the primary blade 42. Instead, the nonlimiting embodiment of the secondary blade 60 represented in the drawings is shown with its tab blades 62 formed entirely from portions of its peaks 64 that are partially cut from the peaks 64 and then bent upward as evident in FIG. 5, resulting in the creation of openings 78 in the peaks 64. The tab blades 62 are shown as contiguous with the leading edge 72 of the secondary blade 60, with the result that the openings 78 are contiguous with the leading edge 72. However, it is foreseeable that the tab blades 62 could be located elsewhere, for example, contiguous with the trailing edge 74 of the secondary blade 60 with the result that the openings 78 would be contiguous with the trailing edge 74, or not contiguous with either edge 72 and 74 so that the openings 78 are closed at both edges 72 and 74 by leading and trailing portions of the peaks 64.

Figure 5:
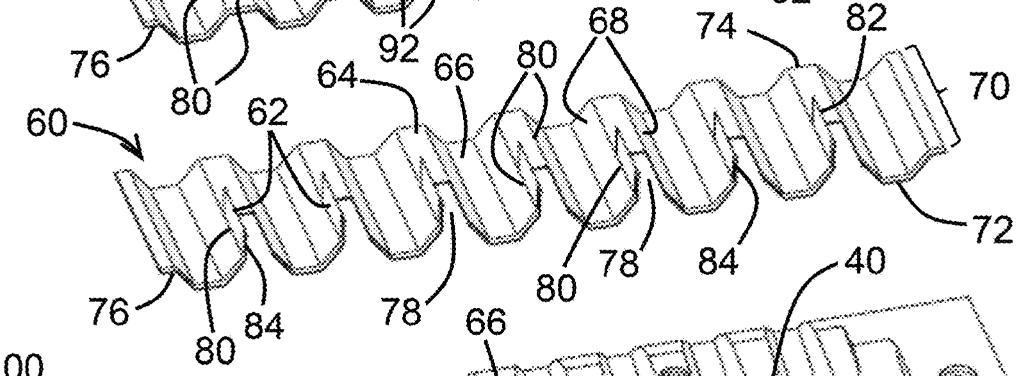
FIG. 5 is a perspective view of a secondary blade produced by modifying the blank of FIG. 4 according to a nonlimiting embodiment of the present invention.

In the nonlimiting embodiment shown, each tab blade 62 remains adjoined to the secondary blade 60 along one of the corners 80 defined by and between one of the peaks 64 and one of the walls 68 that directly joins the peak 64 to an adjoining valley 66. In FIG. 5, it can be seen that the secondary blade 60 lacks tab blades along corners 80 thereof that are defined by and between each peak 64 and a second wall 68 that directly joins the peak 64 to a second adjoining valley 66, such that a single tab blade 62 is associated with each peak 64. However, it is foreseeable that a pair of tab blades 62 could be formed along both corners 80 associated with each peak 64, such that each tab blade 62 of a given pair is adjoined to one of the two corners 80 formed by the two separate intersections between each peak 64 and its two adjoining walls 68. Furthermore, tab blades 62 could be located on every other peak 64, or any other combination of peaks 64.

In the configuration shown in FIGS. 5 through 7, each tab blade 62 is parallel to a depth direction corresponding to the depth 70 of the secondary blade 60, such that the upper edges 82 of the tab blades 62 are also parallel to the depth direction. In addition, edges of the tab blades 62 formed by portions of the leading edge 72 of the secondary blade 60 define cutting edges 84 that are each perpendicular to the upper surface of its adjacent peak 64, and are each contiguous with and lie in a plane that contains the leading edge 72 of the secondary blade 60.

The secondary blade 60 of FIGS. 5 through 7 can be fabricated from a blank 90 represented in FIG. 4. The blank 90 is represented as being identical to the primary blade 42 of FIG. 3, which allows the entire knife assembly 40 to be fabricated from two identical primary blades 42, one of which can be modified in a relatively simple machining process to produce the secondary blade 60. In this case, each tab blade 62 is released from the remainder of the blank 90 by cutting the blank 90 along two lines 92 identified in FIG. 4, one of which is along a first of the two corners 80 formed by a peak 64 and one of its adjoining wall 68, and the other of which is in a transverse direction of the peak 64, resulting in an uninterrupted, generally L-shaped cut that, in the nonlimiting embodiment shown, is located entirely within the peak 64. The L-shaped cut defines a tab that, in the nonlimiting embodiment shown, is entirely surrounded and defined by the L-shaped cut, the second corner 80 associated with the same peak 54, and the leading edge 72 of the secondary blade 60. The tab blade 62 can then be created by bending the tab upward out of the plane of the peak 64, with the resulting bend coinciding with the second corner 80 of the peak 54. Bending the tab blades 62 out of the planes of their respective peaks 64 creates the openings 78 that, in the nonlimiting embodiment shown, are contiguous with the leading edge 72 of the secondary blade 60. The cuts formed in the blank 90 at the lines 92 along the first corners 80 of the peaks 64 are shown as extending up to about half of the depth 70 of the secondary blade 60 to retain a level of rigidity in the blade 60, though longer and shorter cuts along the first corners 80 are foreseeable. Furthermore, the cuts that define the tab blades 62 do not necessarily need to be linear or L-shaped as they are represented in FIGS. 4 and 5, and instead may have various other shapes, including arcuate and/or angled cuts that are not perpendicular or parallel to the corners 80.

As seen in FIG. 6, the leading edge 72 of the secondary blade 60 is displaced a distance 86 in the trailing direction from the cutting (leading) edge 52 of the primary blade 42. To enable the lower surface 76 of the secondary blade 60 to be entirely contacted and supported by the upper surface 56 of the primary blade 42, the depth 70 of the secondary blade 60 can optionally be shortened by the displacement distance 86 so that the trailing edge 74 of the secondary blade 60 coincides with (is superimposed on) the trailing edge 54 of the primary blade 42 when the primary and secondary blades 42 and 60 are assembled to yield the knife assembly 40 of FIGS. 6 and 7. For this purpose, a single cut can be made in the blank 90 along a line 94 identified in FIG. 4, thereby completely removing a trailing portion 96 of the blank 90 that, if manufactured to be identical to the primary blade 42, corresponds to removing a trailing portion of the primary blade 42 that includes its trailing edge 54. However, it is also within the scope of the invention that the trailing edge 74 of the secondary blade 60 could protrude in the trailing direction beyond the trailing edge 54 of the primary blade 42.

In view of the above, the knife assembly 40 is capable of providing uniform julienne cuts without requiring metallurgically joining tab blades to a primary blade. Instead, the primary blade 42 and the secondary blade 60 carrying the tab blades 62 can be secured together solely by the clamp 102 and the manner in which the blades 42 and 60 and knife holder 100 are nested together as a result of the complementary contours of the blade surfaces 56, 58, and 76 and the support surface of the knife holder 100. Superimposing and nesting the secondary blade 60 on the primary blade 42 also has the benefit of increasing the rigidity and strength of the knife assembly 40 at the adjacent leading edges 52, 72, and 108 of the blades 42 and 60 and knife holder 100, increasing the ability of the assembly 40 to resist damage from rocks and other potential debris that might be encountered when slicing a product. Proper nesting between the primary and secondary blades 42 and 60 can be assured by fabricating the secondary blade 60 from a blank 90 that is effectively a second primary blade 42.

FIG. 7 represents the clamp 102 as comprising fingers 106 that engage each of the valleys 66 of the secondary blade 60, such that those portions of the blades 42 and 60 that form their respective valleys 46 and 66 are clamped between the fingers 106 of the clamp 102 and the valleys (not shown) in the support surface of the knife holder 100 that receive the blade valleys 46 and 66. In the nonlimiting embodiment shown, the leading edge 52 of the primary blade 42 projects beyond a leading edge 108 of the knife holder 100 in order to be capable of performing slicing on a product, and the leading edge 72 of the secondary blade 60 is superimposed over the leading edge 108 of the knife holder 100. The fingers 106 are shaped and their distal ends are positioned in close proximity to the leading edge 72 of the secondary blade 60 so that the pressure generated by the clamping action of the clamp 102 is concentrated near the coinciding leading edges 72 and 108 of the secondary blade 60 and knife holder 100, reducing the likelihood that debris generated by the slicing operation might build up between the upper surface 56 of the primary blade 42 and the leading edge 72 of the secondary blade 60.

Figure 8:
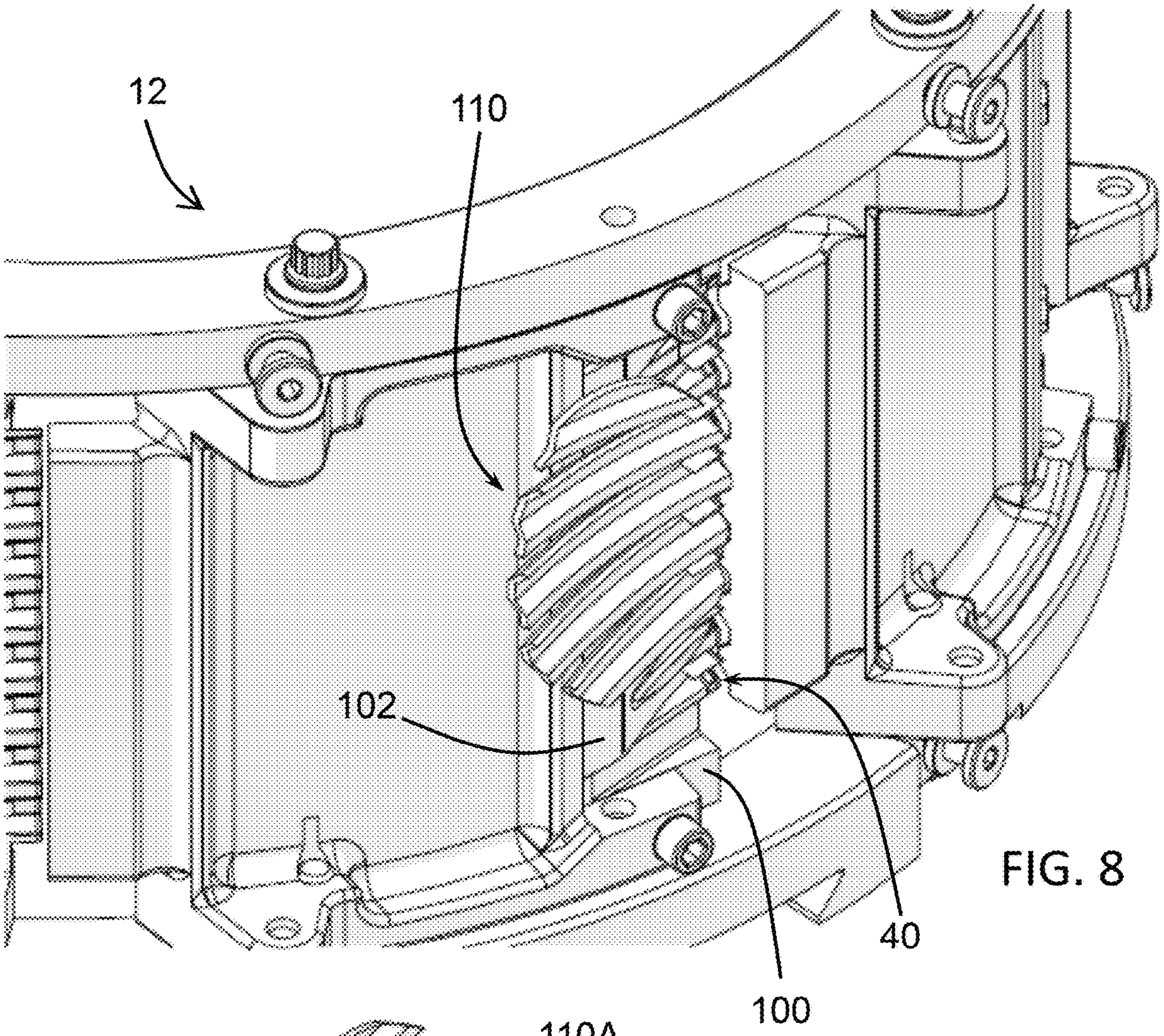
FIG. 8 is a perspective fragmentary view of a cutting head on which the clamp, knife assembly, and knife holder of FIG. 7 have been mounted for producing strip-cut products according to a nonlimiting embodiment of the present invention.
Figure 9:
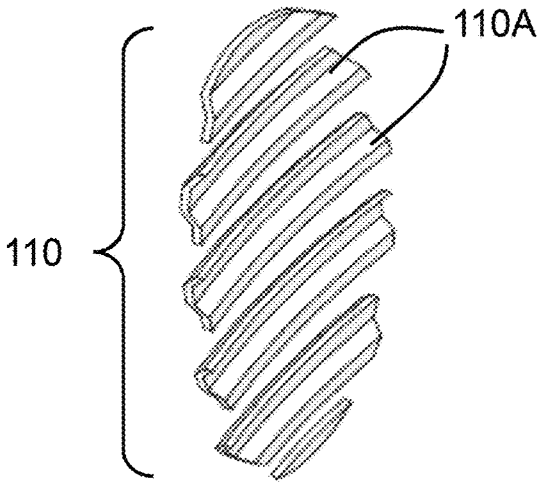
FIG. 9 is a nonlimiting example of a strip-cut product produced with the cutting head of FIG. 8.
Figure 10:
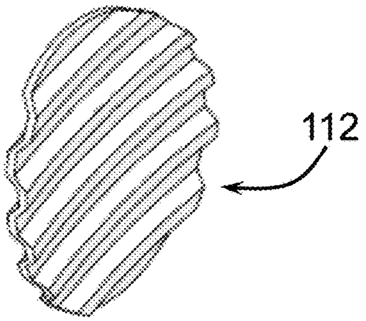
FIG. 10 depicts a sliced product that would be produced with the primary blade of FIG. 3 in the absence of the secondary blade of FIG. 5.

FIG. 8 represents the cutting head 12 of FIG. 2 equipped with the knife assembly 40, knife holder 100, and clamp 102 of FIG. 7. FIG. 8 further depicts a shaped strip-cut product 110 exiting the cutting head 12. FIG. 9 contains an isolated view of the strip-cut product 110, including individual strips 110A of the strip-cut product 110. For comparison, FIG. 10 represents a shaped sliced product 112 that would result from slicing a product (for example, a potato) with the primary blade 42 in the absence of the secondary blade 60 and its tab blades 62. From these representations, it should be apparent that the through-thickness shape of the strip-cut product 110 is determined entirely by the primary blade 42, more typically a plurality of in-phase primary blades 42 that are located around the perimeter of the cutting head 12, whereas separation of the individual strips 110 is determined entirely by the tab blades 62 of the secondary blade 60.

As previously noted above, though the foregoing detailed description describes certain aspects of one or more particular embodiments of the invention, alternatives could be adopted by one skilled in the art. For example, the knife assembly 40 and a cutting head and machine in which it is installed could differ in appearance and construction from what is shown in the drawings. As another example, the amplitude (distance from valley to peak), pitch (distance between peaks), and wall angles of the blades 42 and 60 could differ from what is shown in the drawings. Furthermore, various materials and processes could be used in the manufacture of the knife assembly 40 and its components. As such, and again as was previously noted, it should be understood that the invention is not necessarily limited to any particular embodiment described herein or illustrated in the drawings.

The invention claimed is:

1. A method of fabricating a knife assembly, the method comprising:

providing a primary blade and a blank that is identical to the primary blade, wherein the primary blade and the blank each have an upper surface, a lower surface, a leading edge, a trailing edge, a depth defined by and between the leading and trailing edges, and a corrugated shape that defines a wave pattern comprising peaks and valleys that are flat and interconnected by inclined walls, each of the peaks having a first inclined wall of the inclined walls adjoined thereto to define a first corner therebetween and having a second inclined wall of the inclined walls adjoined thereto to define a second corner therebetween;

fabricating a secondary blade from the blank to have at least a first tab blade projecting from a first peak of the peaks of the blank, the fabricating comprising:

cutting the blank along a first line along the first corner of the first peak and cutting the blank along a second line that is in a transverse direction of the first peak to result in an uninterrupted L-shaped cut that is located entirely within the first peak to form a tab located entirely within the first peak; and then bending the tab so that the tab projects from the first peak, a bend is formed that coincides with the second corner of the first peak, and an opening is defined entirely within the first peak between the first and second corners thereof; and then assembling the secondary blade on the primary blade so that the secondary blade and the peaks and valleys thereof nest with the primary blade and the peaks and valleys thereof.

2. The method of claim 1, wherein the primary and secondary blades are not metallurgically joined together.

3. The method of claim 1, wherein the first tab blade has a cutting edge contiguous with the leading edge of the blank.

4. The method of claim 3, wherein the cutting edge of the first tab blade lies in a plane containing the leading edge of the blank.

5. The method of claim 1, wherein the fabricating further comprises cutting the blank to completely remove a trailing portion of the blank at the trailing edge thereof so that the secondary blade has a depth that is less than the depth of the primary blade.

6. The method of claim 1, wherein the opening is defined in the first peak of the blank to be contiguous with the leading edge of the blank.

7. The method of claim 1, further comprising assembling the primary blade on a knife holder and assembling the secondary blade on the primary blade so that the secondary blade and the peaks and valleys thereof nest with the primary blade and the peaks and valleys thereof.

8. The method of claim 7, further comprising clamping the primary and secondary blades to the knife holder with a clamp.

9. The method of claim 8, wherein the clamp has fingers with distal ends that engage the secondary blade at the leading edge thereof.

* * * * *